United States Patent [19]

Okayama et al.

[11] Patent Number: 5,048,906

[45] Date of Patent: Sep. 17, 1991

[54] WAVEGUIDE TYPE PHOTOSWITCH WITH A SHORT COUPLING REGION

[75] Inventors: Hideaki Okayama; Issei Asabayashi, both of Tokyo, Japan

[73] Assignee: OKI Electric Industry Co., Ltd., Tokyo, Japan

[21] Appl. No.: 544,263

[22] Filed: Jun. 26, 1990

[30] Foreign Application Priority Data

Jun. 26, 1989 [JP] Japan ................... 1-163356

[51] Int. Cl.⁵ .............................................. G02B 6/26
[52] U.S. Cl. ....................................... 385/40; 385/16; 385/50
[58] Field of Search ................. 350/96.13, 96.14, 96.15

[56] References Cited

U.S. PATENT DOCUMENTS

| 4,391,486 | 7/1983 | Papuchon et al. | 350/96.14 |
| 4,674,829 | 6/1987 | Bulmer et al. | 350/96.14 |
| 4,679,893 | 7/1987 | Ramer | 350/96.14 |
| 4,871,223 | 10/1989 | Auracher et al. | 350/96.14 |

FOREIGN PATENT DOCUMENTS 136131  5/1989  Japan .

OTHER PUBLICATIONS

Bulmer et al, "Linear Interferometric Waveguide Modulator . . . ", *Optics Letters*, vol. 5, No. 5, May 1980, pp. 176-178.

McCaughan et al, "Three-Electrode Ti: LiNbO₃ Optical Switch, Journal of Lightwave Technology", vol. LT-4, No. 9, Sep. 1986, pp. 1324-1327.

Nishihara et al, "Optical Integrated Circuit" 1st Ed., Ohm-Sha, Feb. 25, 1985, pp. 304-307.

*Primary Examiner*—John D. Lee
*Attorney, Agent, or Firm*—Spencer & Frank

[57] ABSTRACT

A waveguide type photoswitch has a substrate on which a plurality of waveguide paths are provided in close proximity to each other. Electrodes are arranged along the waveguide paths in a coupling region of the paths. The distance between the waveguide paths is greater at the center of the coupling region than at opposite ends of the region, so that the coupling coefficient can be reduced at the central part of the coupling region and the coupling region itself can be shortened. The electrodes each is shorter than the coupling region to allow the operating voltage to be noticeably lowered and the operation speed to be increased.

7 Claims, 3 Drawing Sheets

WAVEGUIDE TYPE PHOTOSWITCH WITH A SHORT COUPLING REGION

BACKGROUND OF THE INVENTION

1. Field of the Invention

The present invention relates to a photoswitch of the type electrically switching over the direction in which an optical signal is propagated through a waveguide path.

2. Description of the Prior Art

A waveguide type photoswitch has been proposed in various forms in, for example, JOURNAL OF LIGHTWAVE TECHNOLOGY, LT-4[9], pp. 1324–1327, September 1986–1989(hereinafter referred to as document 1), Nishihara et al "Optical Integrated Circuit", First Edition, Ohm-Sha, pp. 304–307, Feb. 25, 1985, (hereinafter referred to as document 2), and Japanese Patent Application No. 295872/1987 (hereinafter referred to as document 3).

FIG. 1 shows a specific structure of a conventional waveguide type photoswitch adopting a directional coupler system, as disclosed in the document 1. The photoswitch has a substrate 12 exhibiting an electrooptical effect, a pair of waveguide paths 14 and 16 formed on the substrate 12 in close proximity to each other, and electrodes 22 and 24 provided in a coupling region 20 which couples waveguide paths 14 and 16. In the coupling region 20, the refractive indexes $n_o$ of the waveguide paths 14 and 16 are controlled by an operating voltage vo which is applied between the electrodes 22 and 24. While the coupling region 20 has a length l, the electrodes 22 and 24 each has a length le which is smaller than the length l. The length l of the coupling region 20 is selected such that while the operating voltage vo is not applied, light entering the waveguide path 14 or 16 is outputted from the waveguide path 16 or 14, i.e. in a cross condition.

The operating voltage vo applied between the electrodes 22 and 24 destroys the resonance condition of the two waveguide paths 14 and 16. Then, light inputted to the waveguide path 14 or 16 is outputted from the same one 14 or 16, i.e. in a bar condition. Assuming that the length le of the individual electrodes 22 and 24 is equal to the length l of the coupling region 20 (l=le), then the light entering the waveguide path 14 or 16 can be fully outputted from the same waveguide path 14 or 16 if a difference $\Delta n_o$ between the refractive indexes of the waveguide paths 14 and 16 satisfies following equation:

$$\frac{2\pi \Delta n_o le}{\lambda} = \sqrt{3\pi} \qquad \text{Eq. (1)}$$

where $\lambda$ is the wavelength of the light in a vacuum.

The refractive index difference $\Delta n_o$ mentioned above is proportional to the operating voltage vo, while the electrode capacitance decreases with the decrease of le of the individual electrodes 22 and 24. It follows that the smaller the left member, $2\pi \Delta n_o e/\lambda$, of the Eq. (1), i.e., the smaller the value of $\Delta n_o le$, the lower the operating voltage vo is. This is successful in reducing the electrode capacitance and thereby enhancing high-speed operation.

When the electrodes 22 and 24 each has a length le which is shorter than the length l of the coupling region 20 (l>le), the waveguide paths 14 and 16 will be brought into a bar condition if the refractive index difference $\Delta n_o$ has a particular value expressed as:

$$\frac{2\pi \Delta n_o le}{\lambda} = \pi \sqrt{1 + \frac{2le}{l}} \qquad \text{Eq. (2)}$$

As the value of le/l included in the right member of the Eq. (2) is sequentially decreased toward zero, the result of the Eq. (2) sequentially approaches $\pi$ and may, therefore, be made smaller than the result of the Eq. (1). More specifically, the product $\Delta n_o le$ is smaller in the Eq. (2) than in the Eq. (1).

It has been customary to provide electrodes each having a small length le in the coupling region 20 so as to lower the operating voltage vo and to thereby enhance high-speed operation.

A problem with the prior art photoswitch having the above structure is as follows. Assuming that the refractive index difference $\Delta n_o$ is constant, a decrease in the length le of the individual electrodes 22 and 24 results in an increase in the length l of the coupling region 20. Specifically, the refractive index difference $\Delta n_o$ and the length l of the coupling region 20 are related as:

$$\frac{2\pi \Delta n_o l}{\lambda} = \pi \sqrt{\frac{l}{le}\left(\frac{l}{le} + 2\right)} \qquad \text{Eq. (3)}$$

In the above Eq. (3), the value of the left member increases as the value of le/l included in the right member is reduced toward zero. More specifically, assuming that the refractive index difference $\Delta n_o$ is constant, the length l of the coupling region 20 increases with the decrease in the length le of the electrodes 22 and 24. This is acceptable so long as the waveguide type photoswitch is used alone. However, when such a photoswitch is integrated in a plurality of stages on a semiconductor substrate, for example, the coupling region 20 having a greater length would undesirably add to the required area of the substrate.

The document 2 teaches a waveguide type photoswitch elaborated to eliminate the above-discussed problem particular to the photoswitch of the document 1. The switch of the document 3 has two waveguide paths arranged side by side on a substrate which exhibits an electrooptical effect. Electrodes are disposed in the coupling region of the two waveguide paths. The distance between the waveguide paths sequentially increases from opposite ends toward the center of the coupling region. In such a switch configuration, the coupling coefficient of the two waveguide paths decreases with the increase in the distance between the waveguide paths. Hence, reducing the coupling coefficient in the position where the two waveguide paths are greatly spaced from each other allows the length of the coupling region to be reduced and the operating voltage to be lowered. Such an approach, however, is not fully satisfactory because it cannot lower the operating voltage beyond a certain level or increase the operating speed to a sufficient degree.

SUMMARY OF THE INVENTION

It is therefore an object of the present invention to provide a waveguide type photoswitch which reduces the length of the coupling region of waveguide paths.

It is another object of the present invention to provide a waveguide type photoswitch which is operable with a far lower operating voltage than the prior art.

It is yet another object of the present invention to provide a waveguide type photoswitch which is operable at a sufficiently high speed.

A waveguide type photoswitch of the present invention comprises a substrate, a plurality of waveguide paths formed on the substrate side by side, and a plurality of electrodes arranged in a coupling region of the waveguide paths. The waveguide paths are configured such that the distance between the paths is greater at the center of the coupling region than at opposite ends of the coupling region. The electrodes extend along the waveguide paths and each has a length smaller than that of the coupling region.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 2:
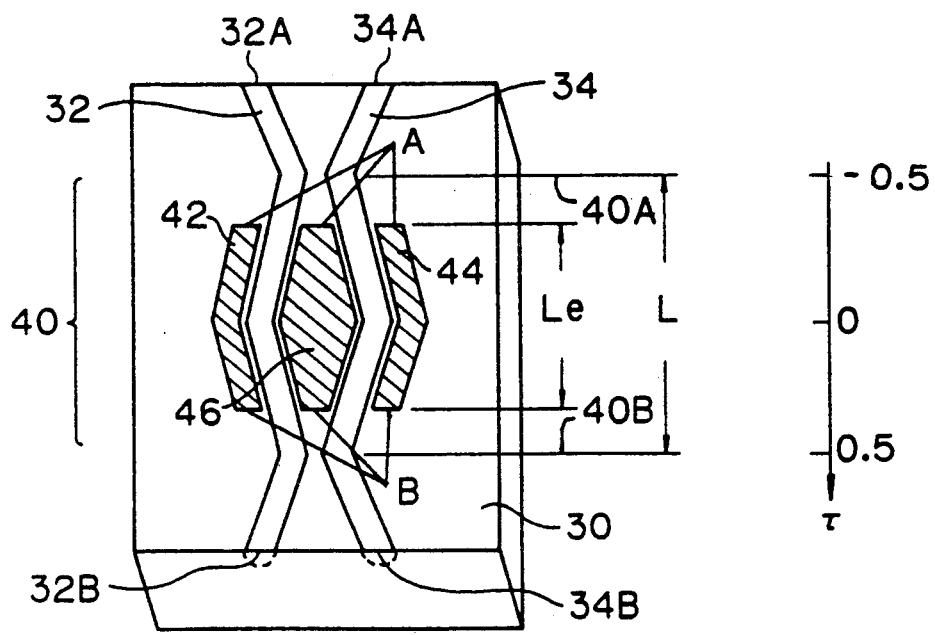
FIG. 2 is a perspective view of a waveguide type photoswitch embodying the present invention.

Referring to FIG. 2, a waveguide type photoswitch embodying the present invention is shown. Also shown in the figure is a parameter $\tau$ representative of a distance as measured from the center of a coupling region 40 which will be described.

In FIG. 2, the photoswitch has a substrate 30 implemented with a lithium niobate (LiNbO$_3$) monocrystal which has an electrooptical effect. Two waveguide paths 32 and 34 are formed on the substrate 30 in close proximity to each other. The waveguide path 32 has an input port 32A and output port 32B, while the waveguide path 34 has an input port 34A and an output port 34B. In the coupling region 40 of the waveguides 32 and 34, the distance between the waveguide paths 32 and 34 is reduced at opposite ends of the coupling region 40 in order to couple optically between the waveguide paths 32 and 34, and it is sequentially increased toward the center of the coupling region 40.

Electrodes 42 and 44 are positioned in the coupling region 40 to extend along the outer side end of the waveguide paths 32 and 34, respectively. An electrode 46 is also located in the coupling region 40 between the inner side end of the waveguide paths 32 and 34. The coupling region 40 has a length L and opposite ends A and B which are spaced equidistantly from the adjacent opposite ends 40A and 40B of the coupling region 40 while the electrodes 42, 44 and 46 each has a length Le which is smaller than the length L. The length L of the coupling region 40 is selected such that while no voltage is applied between the electrodes 42, 44 an 46, light entered the input port 32A or 34A is emitted via the output port 34B or 32B in a cross condition.

In the above configuration, assume that the electrode 46 is connected to ground, and a positive voltage $+V$ or a negative voltage $-V$ is applied between the electrodes 42 and 44. Then, an electric field is developed in the horizontal direction of the substrate 40 to destroy the resonance condition of the two waveguides 32 and 34. As a result, light entering the photoswitch via the input port 32A or 34A leaves it straightforward via the associated output port 32B or 34B in a bar condition. Hence, when the voltage V of predetermined polarity applied between the electrodes 42, 44 and 46 is turned on and off, the direction of light being propagated through the waveguide paths 32 and 34 will be successfully switched over between the cross and bar conditions.

The operation of the photoswitch constructed as shown in FIG. 2 may be represented by an equation, as follows:

$$\frac{\partial \rho}{\partial \tau} = -j\Delta\beta L\rho + j\kappa(\tau)L(\rho^2 - 1) \qquad \text{Eq. (4)}$$

where $\rho$ is the complex amplitude ratio, $\tau$ is the parameter representative of the distance as measured from the center of the coupling region 40, $\Delta\beta$ is the difference in propagation constant between the waveguide paths 32 and 34, and $\kappa(\tau)$ is the coupling coefficient.

In the above Eq. (4), $\Delta\beta$ is equal to $2\pi\Delta n/\lambda$, where $\Delta n$ and $\lambda$ are the difference in refractive index electrically induced between the waveguide paths 32 and 34 and the wavelength of the light in a vacuum, respectively. The value of $\kappa(\tau)L$ included in the Eq. (4) may be represented by a ratio R of the minimum coupling coefficient $\kappa_{min}$ to the maximum coupling coefficient $\kappa_{max}$, with no regard to the formation of the function. It is to be noted that the minimum and maximum coupling coefficients $\kappa_{min}$ and $\kappa_{max}$ are respectively the values measured at the center and opposite ends of the coupling region 40.

The structure and characteristics of the photoswitch of FIG. 2 in which the distance d between the waveguide paths 32 and 34 is sequentially increased from opposite ends to the center of the coupling region 40 will be analyzed by using the Eq. (4).

The coupling coefficient $\kappa(\tau)$ is produced by:

$$\kappa(\tau) = \kappa_o \exp(-\gamma d) \qquad \text{Eq. (5)}$$

where $\kappa_o$ and $\gamma$ are constants.

The differential Eq. (4) is solved as follows:

$$\frac{|\rho|^2}{1 + |\rho|^2} = \sin^2 \int_{-L/2}^{L/2} \kappa(Z)\, dZ \qquad \text{Eq. (6)}$$

$(\Delta\beta = 0)$ where Z is the propagation distance $(Z = L\tau)$.

$$\int_{-L/2}^{L/2} \kappa(Z)\, dZ = \frac{\pi}{2}(2m + 1) \qquad \text{Eq. (7)}$$

$(m = 0, 1, 2, 3 \ldots)$

The value of L obtained by solving the Eq. (7) for $m=0$ is the coupling length $L_o$ as represented by:

$$L_o = \frac{\pi}{2\kappa_{max}} \cdot \frac{(-\ln R)}{1-R} \qquad \text{Eq. (8)}$$

where R is the ratio $\kappa_{min}/\kappa_{max}$.

The length L of the coupling region 40 is selected to be an odd multiple of the coupling length $L_o$. In the illustrative embodiment, L is selected to be equal to $L_o$.

The value of $\kappa(\tau)L$ is produced by:

$$\kappa(\tau)L = \frac{\pi}{2} \times \frac{-\ln R}{1-R} \exp[\ln R(1-2\tau)] \qquad \text{Eq. (9)}$$

Regarding $\Delta\beta$, it has a value only when the absolute value of $\tau$ is smaller than the ratio Le/L.

Figure 3:
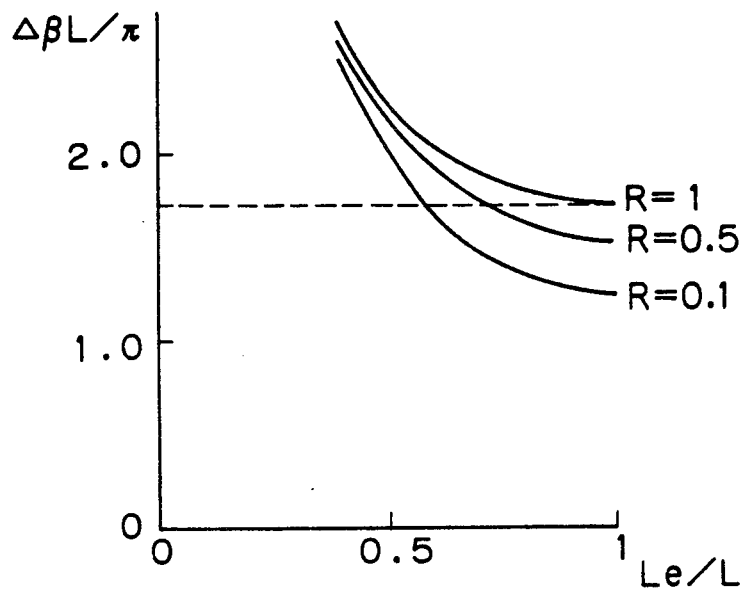
FIG. 3 is a graph representative of a product $\Delta\beta L$ characteristic particular to the switch shown in FIG. 2.
Figure 4:
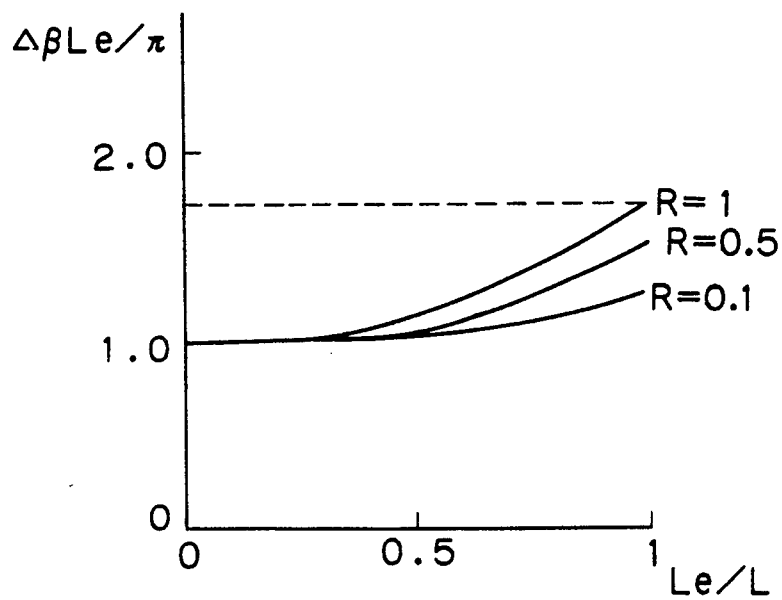
FIG. 4 is a graph showing a product $\Delta\beta Le$ characteristic also particular to the switch of FIG. 2.
Figure 5:
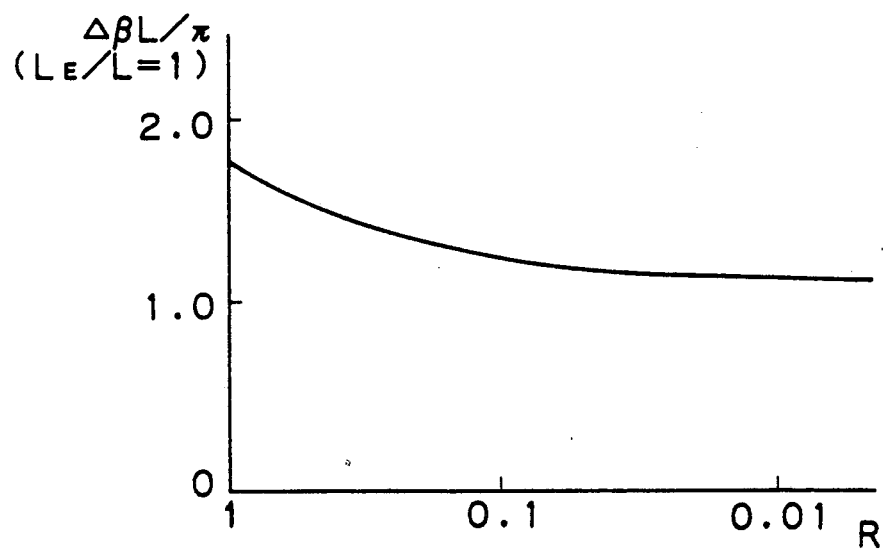
FIG. 5 is a graph showing a product $\Delta\beta Le$ characteristic of the illustrative embodiment which holds in a condition of $L = Le$; and the illustrative embodiment which holds in a condition of $L = Le$.

The results of analysis are represented by curves in FIGS. 3, 4 and 5. Specifically, FIG. 3 shows a product $\Delta\beta L$ characteristic and indicates the values of $\Delta\beta L/\pi$ and Le/L on its ordinate and abscissa, respectively. In FIG. 3, a curve $R=1$ indicates a case wherein the distance between the waveguide paths 32 and 34 is not increased toward the center of the coupling region 40. In this case, sequentially reducing the length Le of the individual electrodes 42, 44 and 46 while maintaining the voltage (i.e. $\Delta\beta$) constant causes the length L of the coupling region 40 to increase. On the other hand, when the distance between the waveguide paths 32 and 34 is increased, the length L can be maintained small even when the electrode length Le is reduced with the voltage remaining the same, as represented by curves $R=0.5$ and $R=0.1$.

FIG. 4 shows a product $\Delta\beta Le$ characteristics and indicates the values of $\beta Le/\pi$ and Le/L on its ordinate and abscissa, respectively. As FIG. 4 indicates, the value of $\Delta\beta Le/\pi$ is smaller when the distance between the waveguide paths 32 and 34 is increased (curves $R=0.5$ and $R=0.1$) than when it is not increased (curve $R=1$). As FIG. 4 also indicates, the value of $\Delta\beta Le/\pi$ further decreases when the length Le of the individual electrodes 42, 44 and 46 is reduced.

FIG. 5 shows a curve representative of a product $\Delta\beta L$ characteristic under the condition of L=Le. In FIG. 5, the ordinate and abscissa indicate $\Delta\beta L/\pi$ (L=Le) and R, respectively. As shown, when the length Le of the individual electrodes 42, 44 and 46 is equal to the length L of the coupling region 40, it is possible to reduce the product $\Delta\beta L$ by increasing the distance between the waveguide paths 32 and 34 (R=0.1 to 0.01). This successfully shortens the length L of the coupling region 40, thereby reducing required operating voltage.

Specifically, in a system having two waveguide paths arranged side by side, two different characteristic modes exist. The difference in propagation constant between the two characteristic modes is expressed as:

$$2\sqrt{\kappa^2 + \delta^2} \qquad \text{Eq. (10)}$$

where $\delta$ is equal to $\Delta\beta/2$, and $\kappa$ is the coupling coefficient.

The phase difference $\phi$ between the two characteristic modes is produced by:

$$\phi = (2\sqrt{\kappa^2 + \delta^2})L \qquad \text{Eq. (11)}$$

The above system is caused into a cross condition when the phase difference $\phi$ is $\pi$ and into a bar state when it is $2\pi$.

Assuming a simplified model of the photoswitch shown in FIG. 2, the coupling constant $\kappa$ is zero at and in the vicinity of the center of the coupling region 40 and can be provided with a sufficiently large value at opposite ends of the coupling region 40, compared to the value $\delta$. When the propagation constant difference $\Delta\beta$ is zero, the phase difference $\phi$ is produced by:

$$2\kappa(L-Le) = \pi \qquad \text{Eq. (12)}$$

On the other hand, when the propagation constant difference $\Delta\beta$ is not zero, the phase difference $\phi$ is determined as:

$$2\kappa(L-Le) + 2\delta Le = 2\pi \qquad \text{Eq. (13)}$$

From the Eqs. (11) and (12), there is obtained:

$$\Delta\beta Le = \pi \qquad \text{Eq. (14)}$$

As the Eq. (14) indicates, the product $\Delta\beta Le$ becomes as small as $\pi$. Such a decrease in $\Delta\beta$ allows the operating voltage to be lowered, while the decrease in Le allows the electrode capacitance to be reduced.

Assuming that the coupling coefficient at the center of the coupling region 40 is $\kappa_p$, then the product $\Delta\beta L$ is expressed as:

$$\Delta\beta L = \pi \sqrt{\frac{L}{Le}\left(\frac{L}{Le} + \frac{4\kappa_p L}{\pi}\right)} \qquad \text{Eq. (15)}$$

As the value of $\kappa_p$ decreases toward zero, the produce $\Delta\beta L$ sequentially decreases. Therefore, assuming that the voltage (i.e. $\Delta\beta$) is constant, the length L of the coupling region 40 decreases as the distance between the waveguide paths 32 and 34 increases ($\kappa_p$ decreases toward zero).

The embodiment constructed and operated as described above has various advantages as enumerated below.

(1) Since the distance between the waveguide paths 32 and 34 gradually increases from opposite ends toward the center of the coupling region 40, the length L of the coupling region 40 is reduced without the operating voltage V being increased. The switch, therefore, can be formed on a semiconductor substrate with a small area.

Figure 1:
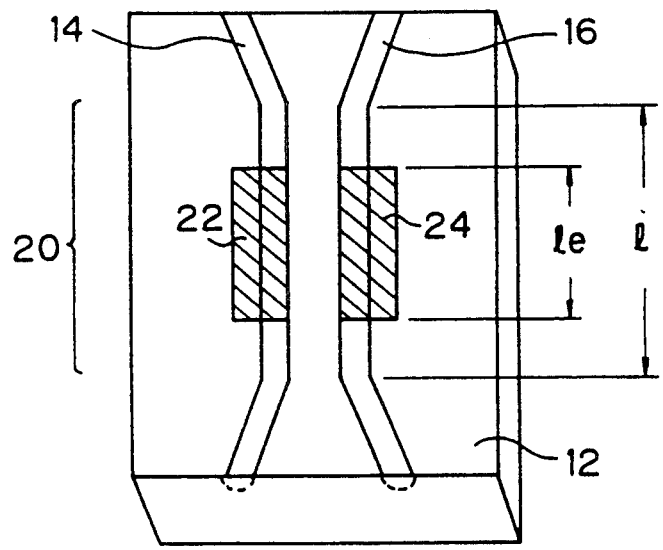
FIG. 1 is a perspective view of a prior art waveguide type photoswitch.

(2) The electrodes 42, 44 and 46 each has a length Le which is smaller than length L of the coupling region 40, so that the operating voltage can be reduced to a significant degree. This reduces the electrode capacitance and thereby enhances high-speed operation. For example, assuming that the ratio Le/L is nearly equal to 0.7 and the ratio R is smaller than 0.1, then the illustrative embodiment reduces the required operating voltage by more than 30 percent, compared to the conventional photoswitch shown in FIG. 1, for the same length of coupling region.

(3) The lower operating voltage V and the lower electrode capacitance improve the switching characteristic of the photoswitch to such an extent that in a bar condition the ratio of light propagated crosswise is greater than 30 decibels.

(4) The electrodes 42 to 46 do not overlap with the waveguide paths 32 and 34. In such a unique configuration, an electric field is developed in the horizontal direction of the substrate 30 while an electrooptical effect is developed in the polarization in the vertical direction, whereby the photoswitch is provided with stable operating characteristics.

Figure 6:
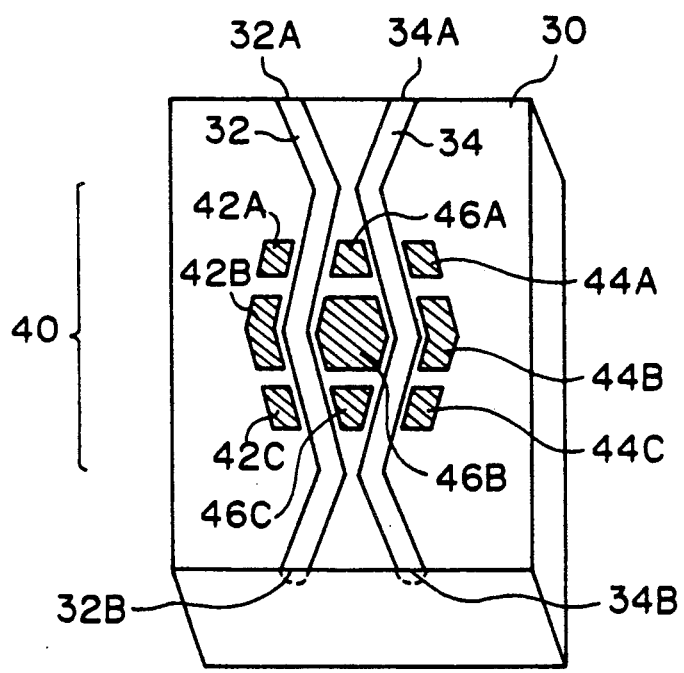
FIG. 6 is a perspective view showing an alternative embodiment of the present invention.

FIG. 6 shows an alternative embodiment of the present invention. In the figures, the same components are designated by like reference numerals, and redundant description will be avoided for simplicity. The embodiment of FIG. 6 differs from that of FIG. 2 concerning the configuration of the three electrodes 42, 44 and 46. Although electrodes 42B, 44B and 46B shown in FIG. 6 are substantially identical in configuration with the electrodes 42, 44 and 46 of FIG. 2, each of them is made up of three segments, as illustrated. Specifically, electrodes 42A, 44A and 46A and electrodes 42C, 44C and 46C are positioned on the substrate 30 at opposite sides of the electrodes 42B, 44B and 46B, respectively. When a bias voltage is applied between the electrodes 42A, 44A and 46A and electrodes 42C, 44C and 46C, an electric field is developed to set up a cross condition. A bar condition is set up when a positive drive voltage +V or a negative drive voltage −V is applied between the electrodes 42B and 44B.

With the embodiment of FIG. 6, it is possible to achieve a cross condition by a predetermined bias voltage close to but not equal to zero, for example. Hence, the switch of FIG. 6 is capable of setting up a cross condition more accurately than the switch of FIG. 2 by having the bias voltage finely adjusted, thereby further improving the ratio of light propagated crosswise in a bar condition.

In summary, it will be seen that the present invention provides a waveguide type photoswitch which is operable with a lower drive voltage and, therefore, with a relatively short coupling region. This unprecedented advantage is derived from a unique configuration wherein the distance between nearby waveguides is gradually increased from opposite ends toward the center of the coupling region. In addition, since the photoswitch is provided with electrodes each being shorter than the coupling region, the drive voltage is noticeably reduced and high-speed operation is enhanced.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. For example, the electrodes 42 and 44 shown in FIG. 2 may be configured to overlap the waveguide paths 32 and 34, respectively. Likewise, the intermediate electrode 46 may be configured to overlap the waveguide paths 32 and 34. Although such a configuration will generate an electric field not only in the horizontal direction but also in the vertical direction, the advantages of the embodiment of FIG. 2 are insured only if the crystalline orientation of the substrate 30, for example, is selected adequately.

The electrode 46 intervening between the electrodes 42 and 44 as shown in FIG. 2 may be omitted in which case the electrodes 42 and 44 will be extended to overlap the waveguides 32 and 34, respectively. In this configuration, a bar condition will be set up when a positive or a negative drive voltage is applied to the electrode 44 or 42 with the electrode 42 or 44 being connected to ground, while a cross condition will be set up when such a drive voltage is not applied.

In any of the illustrative embodiments, the waveguide paths 32 and 34 may each be provided with an arcuate or similar shape other than the angled shape shown and described. Then, the electrodes may also be provided with a particular configuration complementary to the waveguide paths.

The substrate 30 may be implemented as a monocrystalline substrate of $LiTaO_3$ or similar compound, a substrate of InGaAsP, GaAlAs or similar compound semiconductor, etc.

What is claimed is:

1. A waveguide type photoswitch, comprising:
a substrate;
a plurality of waveguide paths formed on said substrate side-by-side and having a coupling region, said waveguide paths being optically coupled in at least a part of said coupling region, said coupling region having opposite coupling region ends, a center between said coupling region ends and a length measured from one of said coupling region ends to the other, a distance between said waveguide paths measured at said center being greater than distances between said waveguide paths respectively measured at said coupling region ends; and
a plurality of electrodes extending along said waveguide paths in a portion of said coupling region which includes said part thereof, said electrodes each having opposite electrode ends, each of said electrode ends being located adjacent to a respective one of said coupling region ends, each of said electrodes having a length, measured from one of said electrode ends to the other, which is less than the length of said coupling region, the electrode ends of each of said electrodes being spaced equidistantly from the respective adjacent coupling region ends.

2. A photoswitch in accordance with claim 1, wherein said waveguide paths comprise two waveguide paths, said electrodes being positioned at the outside of said waveguide paths, and between said waveguide paths.

3. A photoswitch in accordance with claim 2, wherein said electrodes positioned at the outside of and intermediate between said waveguide paths each comprises three segments arranged along said waveguide paths, outermost ones of said segments of each of said electrodes being used as bias electrodes.

4. A photoswitch in accordance with claim 3, wherein said electrodes individually partly overlap said waveguide paths.

5. A photoswitch in accordance with claim 2, wherein said electrodes individually partly overlap said waveguide paths.

6. A waveguide type photoswitch in accordance with claim 1, wherein said electrodes extend continuously in a center part thereof adjacent to said center of said coupling region.

7. A waveguide type photoswitch in accordance with claim 1, wherein said waveguide paths diverge from each other continuously from each of said coupling region ends to said center.

* * * * *